O. H. Weed.
Carpet Sweeper.

N° 90,211.  Patented May 18, 1869.

Witnesses.
Sam¹ C. Fessenden
F. W. Dow

Inventor.
Otis H. Weed.
By his attyˢ A. H. & R. K. Evans

UNITED STATES PATENT OFFICE.

OTIS H. WEED, OF BOSTON, MASSACHUSETTS.

IMPROVED CARPET-SWEEPER.

Specification forming part of Letters Patent No. 90,211, dated May 18, 1869.

*To all whom it may concern:*

Be it known that I, OTIS H. WEED, of Boston, Suffolk county, in the State of Massachusetts, have invented a new and Improved Carpet-Sweeper, of which the following is a full, clear, and exact description, reference being had to the accompanying drawings, making a part of this specification, in which—

Figure 1:
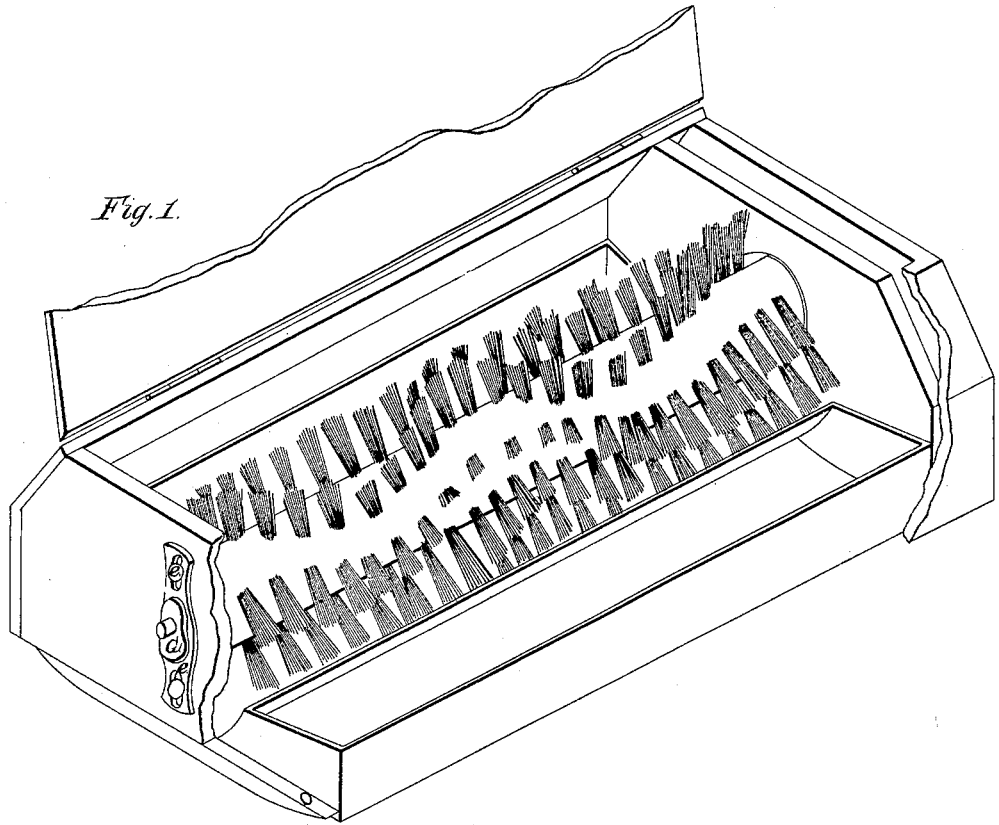
Figure 2:
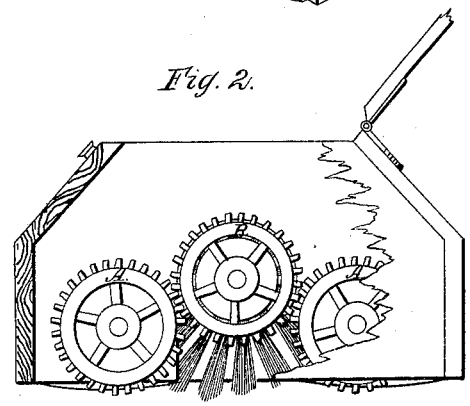
Figure 3:
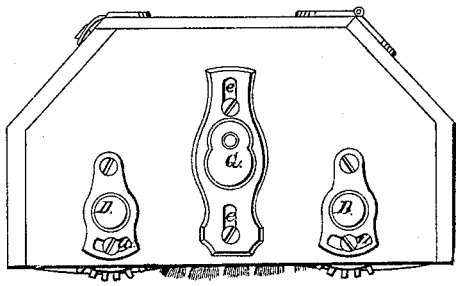

Figure 1 is a perspective view of the sweeper. Fig. 2 is an end view, with the driving-wheels exposed. Fig. 3 is a view of the adjustable bearings.

My invention has for its object to provide a carpet-sweeper having sufficient power in the driving-wheels to secure the constant and easy revolution of the brush whether the sweeper be moved backward or forward.

Sweepers have heretofore been made with only one driving-wheel, working in connection with a wheel on the brush-shaft. This arrangement not only failed to give sufficient propelling-power, but it necessitated the use of trucks or casters on the other corner, to keep the box containing the brush level.

Sweepers have also been made with three pulleys, operating with a rubber band; and to avoid the objection to this mode of gearing, the rubber band extending around the three pulleys was changed to a rubber band around the two outer pulleys, and a rough cog-wheel placed on the end of the brush-shaft, as shown in the patent of G. and H. Purrington, granted January 1, 1867.

It is evident, however, that the frequent use of a sweeper would soon destroy the rubber bands or render them inoperative.

The purpose of my improvement is to avoid these objectionable features, and apply a propelling power which will not fail to revolve the brush, and at the same time avoid the necessity for any additional caster or truck, as the two driving-wheels I employ keep the box level upon the carpet.

To enable others skilled in the art to understand and use my invention, I will proceed to describe the manner in which I have carried it out.

In the drawings, A A are the driving-wheels, provided with cogs which fit into cogs on the wheel B, attached to the brush-shaft.

In the place of the cog-wheel B a rubber gear-wheel may be used, in order to make the operations of the sweeper noiseless.

The driving-wheels A A rest in the horizontal adjustable bearings D D, with their slots *a a*, and the brush-shaft, with its gear-wheel, rests upon the vertical adjustable bearings G G, with its slots *e e*.

What I claim as my invention, and desire to secure by Letters Patent, is—

The combination and arrangement of the driving-wheels A A with their cogs, in combination with the cog-wheel B and adjustable bearings D D and G G, substantially as and for the purpose described.

OTIS H. WEED.

Witnesses:
O. H. WEED, Jr.,
W. H. HAMILTON.